United States Patent [19]
Porter et al.

[11] Patent Number: 5,343,698
[45] Date of Patent: Sep. 6, 1994

[54] HEXAGONAL CLUSTER NOZZLE FOR A ROCKET ENGINE

[75] Inventors: Lane Porter, Jupiter; Edward B. Thayer, Palm Beach Gardens, both of Fla.

[73] Assignee: United Technologies Corporation, Hartford, Conn.

[21] Appl. No.: 54,915

[22] Filed: Apr. 28, 1993

[51] Int. Cl.5 ............................................. F02K 1/00
[52] U.S. Cl. ........................................ 60/271; 60/263; 60/224; 239/265.11
[58] Field of Search .................. 60/271, 224, 263; 239/265.11, 265.19, 265.25

[56] References Cited

U.S. PATENT DOCUMENTS

| | | | |
|---|---|---|---|
| 2,573,697 | 11/1951 | Dunbar et al. | 60/263 |
| 3,115,747 | 12/1963 | Yu | 60/263 |
| 3,817,029 | 6/1974 | Frisch | 60/263 |

FOREIGN PATENT DOCUMENTS 2116966 10/1972 Fed. Rep. of Germany ........ 60/224

*Primary Examiner*—Richard A. Bertsch
*Assistant Examiner*—William Wicker

[57] ABSTRACT

A rocket engine thrust nozzle assembly is disclosed wherein combustion products from a plurality of rocket engines having hexagonally-shaped exhaust areas flow to the inlet of a main nozzle that transitions the flow of the combustion products from a non-circular flow area to a circular flow area.

10 Claims, 3 Drawing Sheets

HEXAGONAL CLUSTER NOZZLE FOR A ROCKET ENGINE

FIELD OF THE INVENTION

This invention relates to rocket engines and particularly to thrust nozzles for such rocket engines.

BACKGROUND ART

In a typical space launch vehicle, small payloads may be satisfactorily launched using only a single rocket engine. Such rocket engines are well known in the art, and it is desirable to use multiples of such rocket engines to launch larger payloads to equal or higher altitudes. However, when multiple engines are used on a launch vehicle, certain performance losses occur which do not occur on a launch vehicle that utilizes only a single rocket engine.

One such performance loss occurs as a result of the fact that when multiple rocket engines having nozzles with circular exhaust areas are clustered together, the interstices between adjacent nozzles (known in the art as aft-facing base area) form flow paths for ambient air to be drawn in to the flow of the combustion products, thereby introducing turbulence into the overall flow stream rocket engines. This turbulence reduces the overall efficiency of the launch vehicle as compared to a comparable launch vehicle having a single large rocket engine. However, because a single large rocket engine for such applications would be very expensive to design and manufacture, multiple rocket engine launch vehicles are utilized despite their associated aft-facing base area performance loss.

What is needed is a nozzle for a multiple rocket engine launch vehicle that minimizes the performance loss associated with aft-facing base area.

DISCLOSURE OF THE INVENTION

It is therefore an object of the present invention to provide a nozzle for a multiple rocket engine launch vehicle that minimizes the performance loss associated with aft-facing base area.

According to the present invention, a hexagonal cluster nozzle is disclosed comprising a cluster of modular rocket engines having circular combustion chambers, circular throats, and hexagonal exhaust areas. The shape of the hexagonal exhaust area allows the modular nozzles to be clustered with a minimal amount of aft-facing base area. The clustered modular nozzles discharge into a single main nozzle that transitions from a notched-hexagonal shape to a circular exit area. Aft-facing base area is minimized by making the main nozzle inlet conform to the notched-hexagonal shape of the clustered modular nozzles, thus reducing the performance loss associated with aft-facing base area.

The foregoing and other features and advantages of the present invention will become more apparent from the following description and accompanying drawings.

BEST MODE FOR CARRYING OUT THE INVENTION

Figure 1:
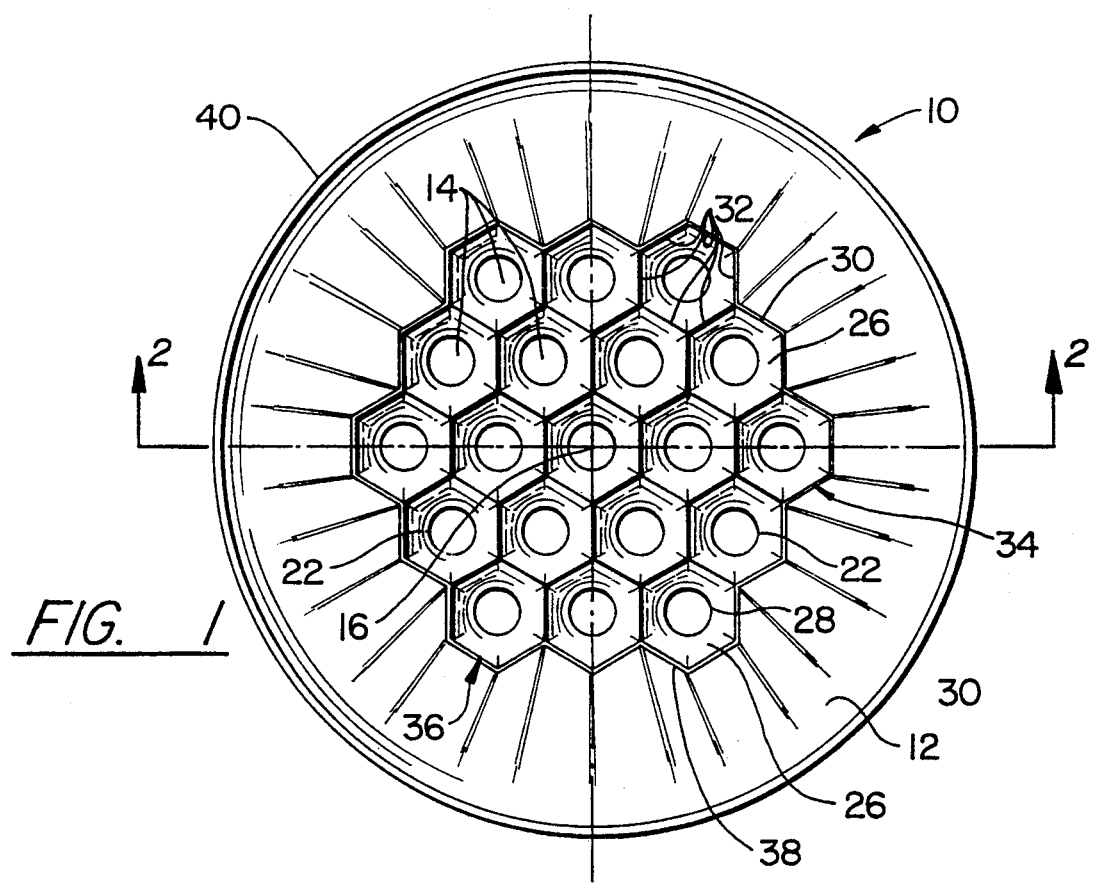
FIG. 1 shows an aft-end-looking-forward view of the hexagonal cluster nozzle of the present invention.
Figure 2:
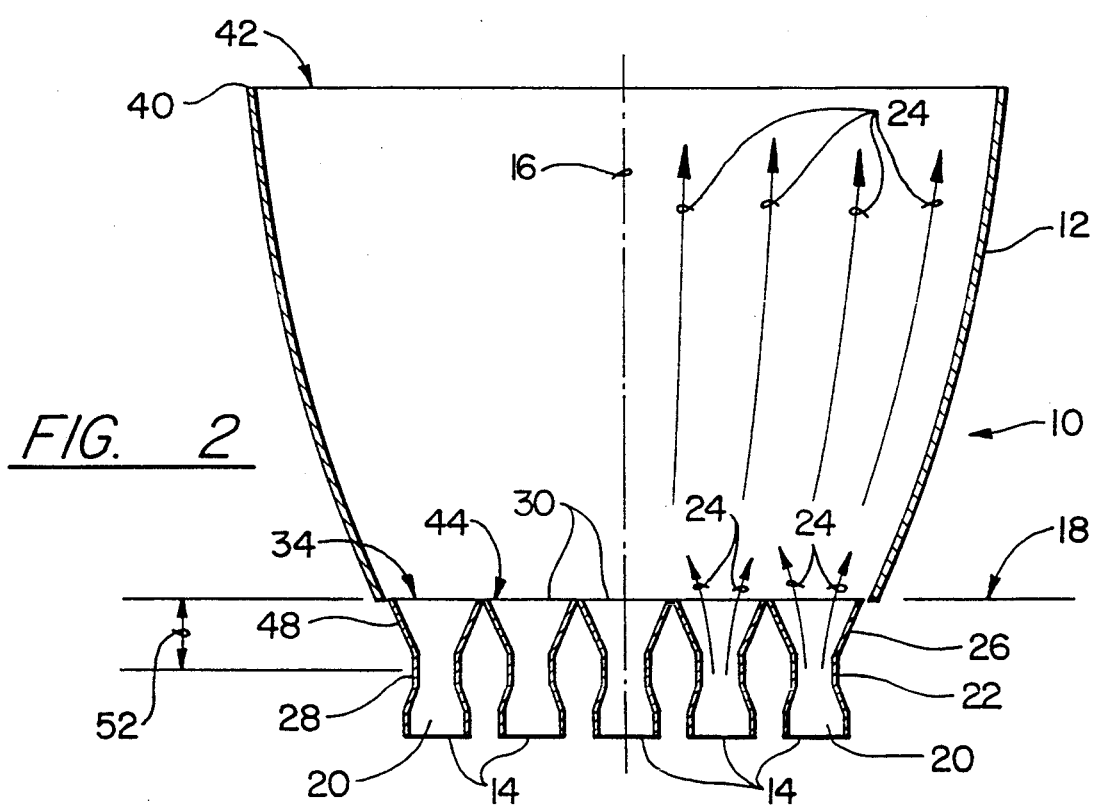
FIG. 2 shows a cross-section of the hexagonal cluster nozzle of FIG. 1 taken along line 2—2.

FIG. 1 shows an aft-end-looking-forward view of the hexagonal cluster rocket engine thrust nozzle 10 of the present invention. The nozzle 10 includes a main nozzle 12 and a plurality of modular rocket engines 14. Referring to FIG. 2, the plurality of modular engines 14 are clustered about a first axis 16 which is, in turn, perpendicular to a first plane 18.

Each modular rocket engine 14 has a combustion chamber 20 having a circular cross section and a circular discharge hole 22, or throat, for discharging combustion products 24 of each engine 14 from of the combustion chamber 20 thereof. Connected to the discharge hole 22 of each combustion chamber 20 is a modular nozzle 26 having a modular nozzle inlet 28 of the same diameter as the circular discharge hole 22 connected thereto. Through the modular nozzle inlet 28, the modular nozzle 26 receives the combustion products 24 from the combustion chamber 20 connected thereto.

Each modular nozzle 26 likewise has a modular nozzle outlet 30 for discharging the combustion products 24 from the modular nozzle 26. Referring again to FIG. 1, each modular nozzle outlet 30 is hexagonal in shape, having six intersecting sides 32 of equal length which define a hexagonally shaped exhaust area 34 located in the first plane 18. The modular nozzle outlets 30 are clustered together in the first plane 18 such that the modular nozzle outlets 30 at the periphery of the cluster form a notched-hexagonal shape 36 in the first plane 18. As used herein, the term "notched-hexagonal" refers to a generally hexagonal shape in which each of the sections that form the six sides of the hexagon are corrugated, or notched, as shown in FIG. 1. As those skilled in the art will readily appreciate, the modular rocket engines 14 may be similar to those known in the art, except that the rocket engines of the present invention incorporate modular nozzles 26 having hexagonally shaped exhaust areas 34. Accordingly, the rocket engines 14 are generally shown schematically, except for the modular nozzles 26. Preferably, the number of modular rocket engines 14 is one greater than a multiple of six (i.e. 7, 19, 37) and are symmetrically clustered about the first axis 16.

Figure 3:
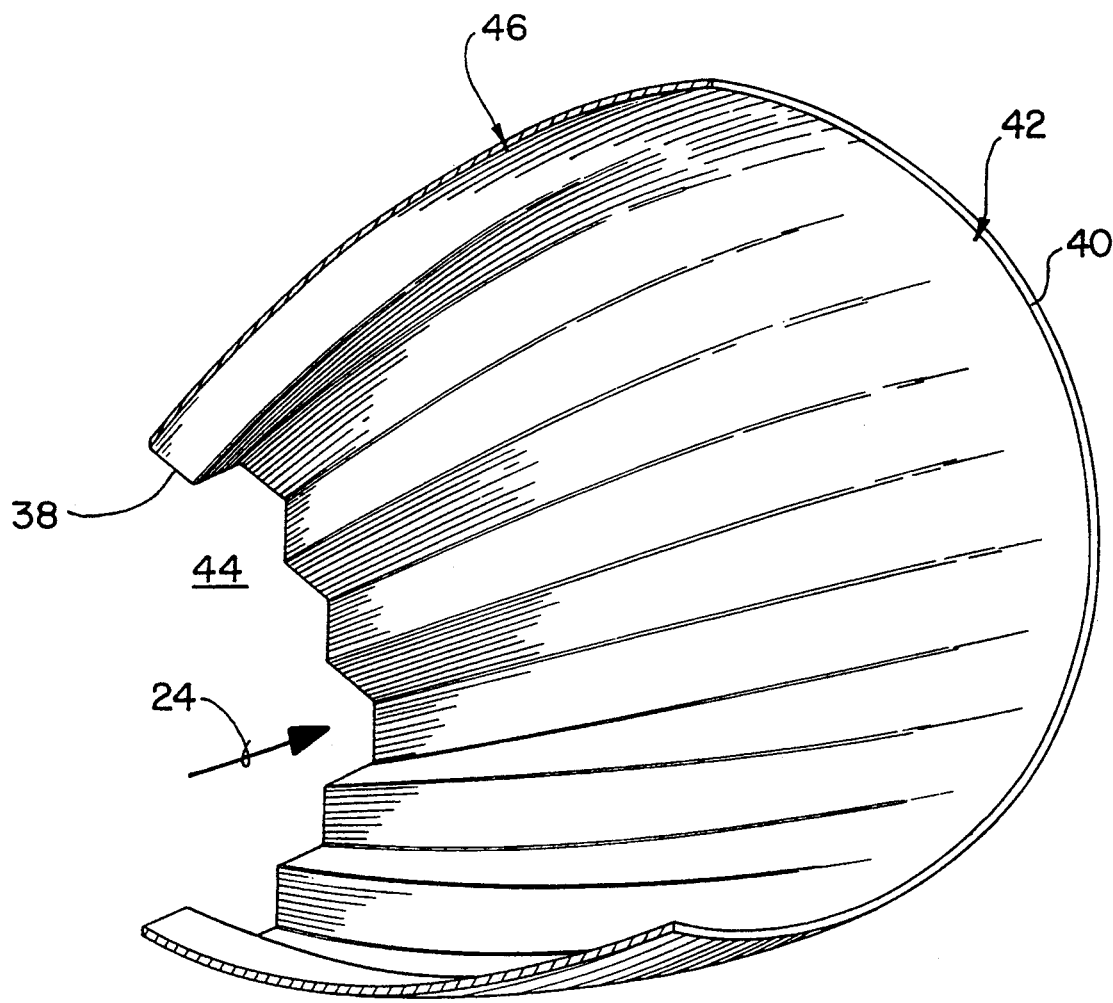
FIG. 3 shows an isometric view of the shape of the inner surface of the main nozzle of the present invention.

As shown in FIGS. 1 and 2, the present invention further includes a main nozzle 12 that is coaxial with the first axis 16. The main nozzle 12 has a main nozzle inlet 38 and a main nozzle outlet 40, and the main nozzle inlet 38 is located in the first plane 18 for receiving the combustion products 24 from the modular nozzle outlets 30. The main nozzle inlet 38 circumscribes the notched-hexagonal shape 36 and therefore provides a main nozzle inlet 38 identical in size and shape to the notched-hexagonal shape 36, while the main nozzle outlet 40 defines a circular exhaust area 42. It should be noted that although the main nozzle inlet 38 is shown in spaced relation to the periphery 36 of the cluster of modular nozzles in FIG. 1, this is for the purpose of clarity only. Accordingly, as shown in FIG. 3, the main nozzle inlet 38 defines a main nozzle inlet area 44 that is essentially equal to the sum of the hexagonally shaped exhaust areas 34. Since the main nozzle inlet area 44 is non-circular and the main nozzle exhaust area 42 is circular, the flow of combustion products 24 through the main nozzle 12 must smoothly transition from the notched-hexagonal shape of the main nozzle inlet area 44 to the circular exhaust area 42. This is accomplished by providing an inner surface 46 that extends between the main nozzle inlet 38 and the main nozzle outlet 40 as shown in FIG. 3. The inner surface 46 defines a boundary for flow of the combustion products 24 through the main nozzle 12, and is preferably a section of a paraboloid, one end of which has been creased, or corrugated, to conform the shape of the notched-hexagonal shape 36 to form the main nozzle inlet 38.

Figure 4:
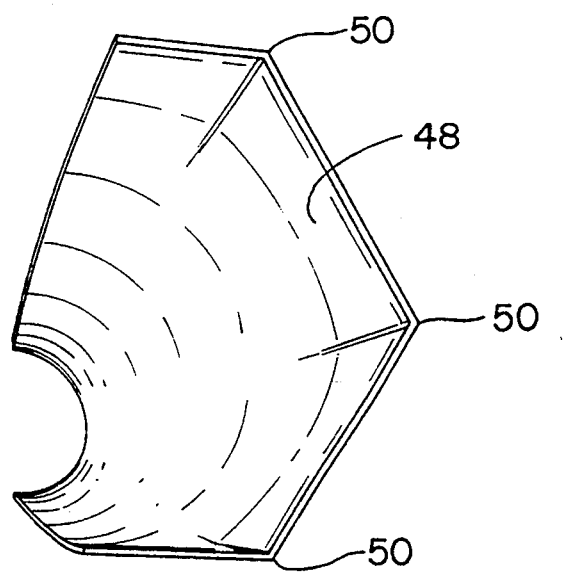
FIG. 4 shows an isometric end view of a first embodiment of one of the modular nozzles of the present invention.
Figure 5:
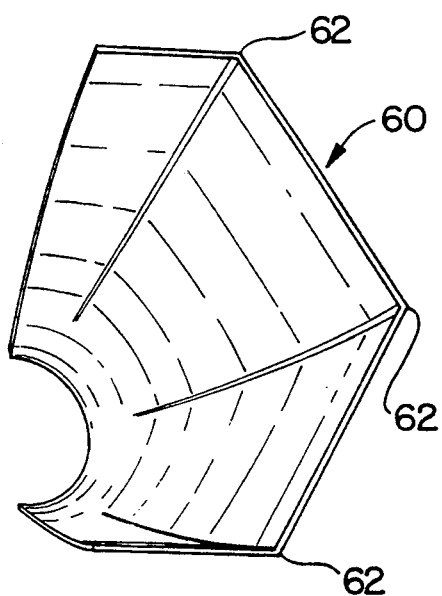
FIG. 5 shows an isometric end view of a second embodiment of one of the modular nozzles of the present invention.

As shown in FIGS. 4 and 5, each modular nozzle 26 comprises a tubular wall 48 having six creases (only three of which are shown for clarity), each crease originating at the intersection of two of the sides 32 of a modular nozzle outlet 30 and extending toward the modular nozzle inlet 28 thereof. The creases 50 of each modular nozzle 26 are equally spaced about the circumference of the tubular wall 48 thereof to ensure symmetric flow of the combustion products 24 flowing therethrough. Each modular nozzle 26 has a nozzle length 52 defined by the distance between the modular nozzle inlet 28 and the modular nozzle outlet 30 thereof as shown in FIG. 2.

Figure 6:
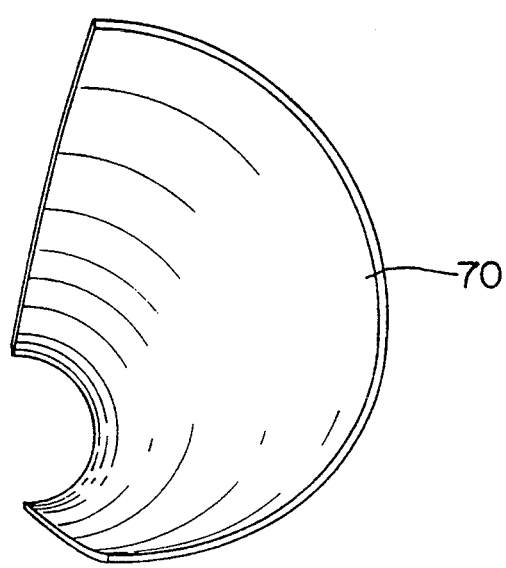
FIG. 6 shows an isometric end view of an expansion nozzle of the prior art.

Each modular nozzle 26 is shaped like a section of a paraboloid one end of which has been creased to conform to the shape of hexagon to form the modular nozzle outlet 30. Preferably, each modular nozzle 26 transitions from a substantially circular cross section to a substantially hexagonal cross section at a distance from the modular nozzle inlet 28 that is 60% of the nozzle length 52, so that the creases 50 of each modular nozzle 26 terminate short of the modular nozzle inlet 28 thereof. An alternate embodiment 60 of the present invention is shown in FIG. 5 in which the creases 62 of each modular nozzle 26 extend the length 52 of the modular nozzle 26, terminating at the modular nozzle inlet 28. Initial indications are that the preferred embodiment of the modular nozzle 26 experiences only a 0.2% performance loss over the comparable axisymmetric nozzle 70 of the prior art, shown in FIG. 6, while the alternate embodiment 60 of the modular nozzle 26 experiences a 0.3% performance loss as compared to the same axisymmetric nozzle 70.

In operation, combustion products 24 from the modular rocket engines 14 flows through the modular nozzles 26, transitioning to a flow area 44 shaped like the main nozzle inlet 38. The combustion products 24 then flow through the main nozzle 12, transitioning to a circular flow area 42 at the main nozzle outlet 40. The combustion products 24 flow from a single nozzle 12 and therefore greatly reduce the performance losses associated with the relatively large base areas of launch vehicles which incorporate multiple rocket engines. The performance losses associated with transitioning the flow areas of the combustion products 24 from circular to non-circular and back to circular in the present invention are significantly less than the performance loss resulting from the large aft-facing base areas of the multiple rocket engine launch vehicles of the prior art, resulting in a net increase in overall performance.

Although this invention has been shown and described with respect to detailed embodiments thereof, it will be understood by those skilled in the art that various changes in form and detail thereof may be made without departing from the original spirit and scope of the claimed invention.

We claim:

1. A thrust nozzle for a rocket engine comprising:
   a plurality of modular rocket engines clustered about a first axis that is perpendicular to a first plane, each modular rocket engine including
   a combustion chamber having a circular cross section and a circular discharge hole for discharging combustion products of the combustion chamber, and
   a modular nozzle having a modular nozzle inlet of the same diameter as the circular discharge hole and connected thereto for receiving the combustion products therefrom, and a modular nozzle outlet for discharging the combustion products from the modular nozzle, said modular nozzle outlet defining a hexagonally shaped exhaust area located in the first plane; and,
   a main nozzle having a main nozzle inlet and a main nozzle outlet, said main nozzle inlet located in the first plane for receiving the combustion products from the modular nozzle outlets;
   wherein the modular nozzle outlets are clustered together to form a notched-hexagonal shape in the first plane, and the main nozzle inlet circumscribes and conforms to the notched-hexagonal shape.

2. The thrust nozzle of claim 1 wherein the main nozzle inlet defines a main nozzle inlet area that is essentially equal to the sum of the hexagonally shaped exhaust areas.

3. The thrust nozzle of claim 2 wherein the main nozzle outlet defines a circular exhaust area.

4. The thrust nozzle of claim 3 wherein the main nozzle further comprises means for smoothly transitioning the flow of combustion products through the main nozzle from the notched-hexagonal shape to the circular exhaust area.

5. The thrust nozzle of claim 4 wherein the means for smoothly transitioning the flow of combustion products comprises an inner surface extending between said main nozzle inlet and said main nozzle outlet, said inner surface defining a boundary for flow of the combustion products through the main nozzle.

6. The thrust nozzle of claim 2 wherein each modular nozzle comprises a tubular wall having six creases, each crease originating at said modular nozzle outlet and extending toward said modular nozzle inlet.

7. The thrust nozzle of claim 6 wherein the creases of each modular nozzle are equally spaced about the circumference of the tubular wall thereof.

8. The thrust nozzle of claim 7 wherein the creases of each modular nozzle terminate at the modular nozzle inlet.

9. The thrust nozzle of claim 7 wherein the creases of each modular nozzle terminate short of the modular nozzle inlet.

10. The thrust nozzle of claim 9 wherein each nozzle has a nozzle length defined by the distance between the modular nozzle inlet and the modular nozzle outlet thereof, and each modular nozzle transitions from a substantially circular cross section to a substantially hexagonal cross section at a distance from the modular nozzle inlet that is 60% of the nozzle length.

* * * * *